(12) United States Patent
Takeshima et al.

(10) Patent No.: US 10,118,313 B2
(45) Date of Patent: Nov. 6, 2018

(54) TUBULAR IN-LINE MIXING DEVICE

(71) Applicant: JAFEC USA, Inc., San Jose, CA (US)

(72) Inventors: Shigeru Takeshima, San Carlos, CA (US); Tsuyoshi Takahashi, Miyagi-ken (JP)

(73) Assignee: JAFEC USA, Inc., San Jose, CA (US)

( * ) Notice: Subject to any disclaimer, the term of this patent is extended or adjusted under 35 U.S.C. 154(b) by 171 days.

(21) Appl. No.: 15/215,551

(22) Filed: Jul. 20, 2016

(65) Prior Publication Data

US 2017/0021528 A1    Jan. 26, 2017

Related U.S. Application Data

(60) Provisional application No. 62/195,285, filed on Jul. 21, 2015.

(51) Int. Cl.
| | |
|---|---|
| *B09C 1/00* | (2006.01) |
| *B28C 5/12* | (2006.01) |
| *B09B 3/00* | (2006.01) |
| *B28C 7/14* | (2006.01) |
| *B28C 5/06* | (2006.01) |
| *B01F 5/00* | (2006.01) |
| *B01F 5/04* | (2006.01) |
| *B01F 5/06* | (2006.01) |
| *E02F 7/06* | (2006.01) |

(52) U.S. Cl.
CPC .......... *B28C 5/1238* (2013.01); *B01F 5/0065* (2013.01); *B01F 5/0451* (2013.01); *B01F 5/0463* (2013.01); *B01F 5/0612* (2013.01); *B01F 5/0618* (2013.01); *B09B 3/0041* (2013.01); *B09C 1/00* (2013.01); *B28C 5/06* (2013.01); *B28C 7/14* (2013.01); *E02F 7/06* (2013.01); *B01F 2005/0637* (2013.01)

(58) Field of Classification Search
USPC .......................................................... 366/66
See application file for complete search history.

(56) References Cited

U.S. PATENT DOCUMENTS

| | | | | |
|---|---|---|---|---|
| 2,996,287 | A * | 8/1961 | Audran ................. | B01F 7/1625 261/121.1 |
| 3,478,099 | A * | 11/1969 | Fohlen ............... | C08G 18/7664 252/401 |
| 4,109,318 | A * | 8/1978 | Hutchings ............. | B01F 5/0656 137/897 |
| 4,123,178 | A * | 10/1978 | Salzman ............... | B01F 5/0656 366/338 |
| 4,522,504 | A * | 6/1985 | Greverath ............. | B01F 5/0615 138/40 |
| 5,161,456 | A * | 11/1992 | Ehrlinger ............ | B01F 3/04787 261/44.1 |

(Continued)

*Primary Examiner* — Mark Halpern
(74) *Attorney, Agent, or Firm* — Tue Nguyen; Patent2IP LLC (57) ABSTRACT

This invention generally relates to a mixing at least one material with at least one other material within an in-line mixing device. In one example embodiment methods, apparatuses, and systems are described to treat, reuse or otherwise remediate dredged or raw material from bottom sediment or other sources through the mixture of raw material and another material such as a hardening agent into a homogenous material for contamination remediation, use as construction materials or other uses.

20 Claims, 10 Drawing Sheets

(56) References Cited

U.S. PATENT DOCUMENTS

| | | | |
|---|---|---|---|
| 2005/0094482 A1* | 5/2005 | Foster, Jr. | B01F 3/04453 366/101 |
| 2008/0025144 A1* | 1/2008 | Kocienski | B01F 7/00641 366/270 |
| 2008/0251454 A1* | 10/2008 | Waibel | B01D 11/0203 210/634 |
| 2011/0014487 A1* | 1/2011 | Gann | B01J 19/006 428/530 |
| 2011/0297291 A1* | 12/2011 | Hauber | B32B 13/04 156/44 |
| 2013/0164411 A1* | 6/2013 | Skovby | C02F 1/68 426/66 |
| 2015/0296867 A1* | 10/2015 | Mazer | A23P 1/12 426/512 |

* cited by examiner

TUBULAR IN-LINE MIXING DEVICE

This application claims priority from U.S. Provisional Application No. 62/195,285 filed on Jul. 21, 2015 entitled 'Tubular In-Line Mixing Device' (JAF002/PRO), which are all incorporated herein by reference.

FIELD OF TECHNOLOGY

This disclosure relates generally to a mixing at least one material with at least one other material within an in-line mixing device. In one example embodiment methods, apparatuses, and systems are described to treat, reuse or otherwise remediate dredged or raw material from bottom sediment or other sources through the mixture of raw material and another material such as a hardening agent into a homogenous material for contamination remediation, use as construction materials or other uses.

BACKGROUND

Within many fields, notably dredging waterways and ship canals, material including soils such as mud and other bottom sediment necessitate excavation and removal to other locations. This soil material is sometimes used for construction, redeposited on coastal features such as beaches, headlands or lagoons, the floor of a nearby channel, bay, or other waterway or body of water, at sea or on land. This material is often contaminated and remedial actions may be needed before reuse or deposit.

Common current practices and processes for remedial action for any soil, such as dredged soil, is highly involved, costly and includes many different steps and machinery. A few options exist to clean or remediate the soil material, such as removing the contaminants and redepositing the soil, or simply depositing non-contaminated soil in a new location. However, when required, removing the containments is costly and simply depositing the soil is inefficient. An improved current process then includes a method where one process is to mix the dredged or raw material with an agent which may be a hardening agent or other material, so that the soil or soil and contaminants become solidified or suspended permanently in the matrix of the hardening agent or similar material and may be rendered useful, such as being turned into soil cement or similar material as well as the containments, if they exist in the soil, may be rendered harmless or non-detrimental to the environment or users. This method then is efficient, in that it reduces the environmental impact of the contaminants and also allows for the reuse of the contaminated or non-contaminated material as fill material or similar materials.

However, the process of specifically mixing the raw material or dredged sediment sand hardening agent or other material for use is still costly as it involves many mixing containers, materials, processes and machinery including the use of kneading mixers which take time and are costly. This provides a hurdle both technically and economically for the remedial use of the contaminated or uncontaminated dredged or raw material, and thus a problem exists for further improvement in efficiency in the use of remediated soil.

SUMMARY

Disclosed are methods, apparatuses, and systems that provide a treating for any material including, but not limited to soil, dredged soft or hard clay, silt, sand, mud, or other sediment, of which may contaminated or not contaminated. The disclosed methods, apparatus and systems may provide a solution in which a special treating facility such as a kneading mixer or many other machinery which may made unnecessary.

In this aspect, the present invention may comprise as an in-line tubular mixing device. Within the in-line mixing device incoming material, of which may be designated as "raw material" for convenience, but also may be preprocessed, from other sources or of be made up of any material, may be force fed into the pipe by air or another method for moving material in an offshore or onshore environment. Within the in-line device the aforementioned raw material and another material of which may be designated as "agent" for convenience, and of which may be a hardening agent in slurry or dry form or may be any other material, may be homogeneously mixed to a variety of ratios, mixtures and contents depending on the implied applications. This may be controlled by the use of sensors, control surfaces such as valves or pressure gates and a processing center. The sensors may measure viscosity, velocity, water content, pressure, unit weight, or other variables and may report the variables and their values to a processing center. The processing sensor which may be a computer, electronic device, human operator, pressure valve or other mechanical or electronic device and which may have a User Interface (UI) or manual or automatic interface, may then limit the input viscosity, velocity, volume or other variables at various points of both material supply points, the mixing tube itself or in the exit tubes to a desired effect through control surfaces or other devices that may have the ability to change characteristics including but not limited to plug flow, inputs, outputs, pressure release valves etc.

The tubular in-line mixing device may be of a larger diameter than the input and output lines which may facilitate agitation and mixing function through pressure differences and surface interaction. The agent may be pressurized and fed into the in-line mixing device through an additional smaller shaft running centrally and surrounded by the moving raw material for the length of the in-line mixing section device. The agent may escape or be delivered from the internal pipe through ejection points, nozzles, cavities and holes within the internal pipe mixing with the raw material with its own pressure and velocity causing agitating and mixing action.

Within the inline mixing device, there may be blades or vanes of varying thickness, shape and degrees that connect the internal pipe and the external pipe's internal walls which may create further agitation and mixing as the raw material moves down line with the agent. The in-line tubular mixing device may be diagonally opposed to the input and output pipe of the raw material which may cause further agitation and turbulence of the raw material and agent. The entrance and exit of the in-line mixing section and the entire device may form or resemble a plug flow that provides further agitation from both the material passing and building back pressure may cause agitation within the in-line mixing section device and the surrounding pipe or tube. In another embodiment, the entrance may be a smaller diameter than the mixing device diameter structure and exit, wherein the increasing area available for the material causes further agitation, turbulence and mixing.

The present device thus may homogeneously mix a raw material such as dredged material and an agent such as a hardening agent or other processing material by an extremely simple method in the mixing section when the raw material or similar raw material is force-fed by air or otherwise towards a destination.

The methods and systems disclosed herein may be implemented in any means for achieving various aspects. Other features will be apparent from the accompanying drawings and from the detailed description that follows.

DETAILED DESCRIPTION AND EMBODIMENTS

Disclosed are methods, apparatus, and systems that may provide an economical solidification treating method and device for soils such as dredged soft or hard clay, silt, sand, mud, or other sediment or materials which may be contaminated or not contaminated in which a special solidification treating facility such as a kneading mixer is made unnecessary.

Although the present embodiments have been described with reference to specific example embodiments, it will be evident that various modifications and changes may be made to these embodiments without departing from the broader spirit and scope of the various embodiments.

Particularly, the device may mix materials to a different effect than the aforementioned solidification. As such, the input material may of any raw or other material, and the agent, may be of any other agent or material, as to be mixed to a desired effect. One effect may be that the agent reacts with or otherwise counteracts the contaminated material, rendering it less harmful or benign to the environment or user.

It should be understood by one of ordinary skill in the art that the terms describing processes, products, element, or methods are industry terms and may refer to similar alternatives. In addition, the components shown in the figures, their connections, couples, and relationships, and their functions, are meant to be exemplary only, and are not meant to limit the embodiments described herein.

Example embodiments are illustrated by way of example and are not limited to the figures of the accompanying drawings, in which, like references indicate similar elements.

In one or more embodiments, the present invention relates to a mixing device.

In one or more embodiments, the present invention relates to an inline mixing device.

In one or more embodiments, the present invention relates to an inline mixing device with an input and an output.

In one or more embodiments, the present invention relates to an inline mixing device with at least one input and at least one output.

In one or more embodiments, the present invention relates to an inline mixing device with multiple inputs and multiple outputs.

In one or more embodiments the present invention relates to a cylinder, tube, rectangular prism, or any other shaped mixing device with multiple inputs and multiple outputs.

In one or more embodiments, the present invention relates to an inline tube, cube or otherwise shaped mixing device with multiple input and multiple outputs.

In one or more embodiments, the present invention relates to an inline tubular mixing device with multiple input and multiple outputs.

In one or more embodiments, the present invention relates to an inline tubular mixing device which may have at least one input and at least one output.

In one or more embodiments the present invention relates to an inline tubular mixing device which may have one or multiple inputs and one or multiple outputs where the mixing section may be at any angle in reference to the pipe, system or other device in which the present invention is in-line or associated to.

In one or more embodiments, the present invention relates to an inline tubular mixing device which may have one or multiple inputs, where the mixing section may be at any angle in reference to the pipe, system or other device in which the present invention is in-line or associated to and that at least one of the inputs may receive material of which may be designated as raw, such as dredged material, soils or otherwise, but also may be preprocessed or of any material and that at least one of the outputs may eject the material after processing or other function(s).

In one or more embodiments, the present invention relates to an inline tubular mixing device which may have one or multiple inputs, where the mixing section may be at any angle in reference to the pipe, system or other device in which the present invention is in-line or associated to and that at least one of the inputs may receive material of which may be designated as raw, such as dredged material, soils or otherwise, but also may be preprocessed or of any material and another input or inputs which may receive an agent such as a hardening agent, other processing material or any material for any reason or function and that at least one of the outputs may eject the material(s) after processing or other function and may be homogenously or heterogeneously mixed.

In one or more embodiments, the present invention relates to an inline tubular mixing device which may have one or multiple inputs, where the mixing section may be at any angle in reference to the pipe, system or other device in which the present invention is in-line or associated to and that at least one of the inputs may receive material of which may be designated as raw, such as dredged material, soils or otherwise, but also may be preprocessed or of any material and another input or inputs which may receive an agent such as a hardening agent, other processing material or any material for any reason or function and that at least one of the outputs may eject the material(s) after processing or other function and may be homogenously or heterogeneously mixed. The embodiments may use turbulence, high pressure, agitation, temperature or other processes to mix or process the inputted material(s).

In one or more embodiments, the present invention may, in addition to the above or below embodiments, mix or process the materials homogenously or heterogeneously, through turbulence, agitation or otherwise caused by the in-line mixing section diagonally or otherwise opposed to the direction of the tube or pipes at the entrance or exits.

In another embodiment, which may be in addition to the above or below embodiments, the device may further mix or process the materials homogenously or heterogeneously, through turbulence, agitation or otherwise which may be caused by a pressure, vacuum, size or other related process caused by the differential in size, diameter or otherwise, of the input pipe, output pipe and in-line mixing section.

In another embodiment, which may be in addition to the above or below embodiments, the device may further mix or process the materials homogenously or heterogeneously, through turbulence, agitation or otherwise which may be caused by an internal hollow shaft or pipe in which has an input and alternatively internal exits that are ejection or other style ports that may be uniformly on non-uniformly spread along the shaft or pipe and of which an agent such as a hardening agent, which may be of high pressure or low pressure exit and contact the raw material to be mixed. This may cause the raw material and agent to agitate and mix.

In another embodiment, which may be in addition to the above or below embodiments, the device may further mix or process the materials homogenously or heterogeneously, through turbulence, agitation or otherwise caused by blades, vanes or other devices of various sizes, types or plurality which may cause further agitation and turbulence of the materials and may result in further mixing.

In another embodiment, which may be in addition to the above or below embodiments, the device may further mix or process the materials homogenously or heterogeneously, through turbulence, agitation or otherwise caused a plug flow on the end or exit of the device, which may cause a pressure difference, partial blockage or other method or characteristic that may further agitation, turbulence or mixing.

In another embodiment, the inlet may be a larger diameter than outlet causing the mixing device to act as a bottleneck, creating further agitation and mixing.

In another embodiment, the inlet may be a smaller diameter than the mixing device diameter cylinder structure and outlet, wherein the increasing area available for the material causes further agitation, turbulence and mixing.

In another embodiment which may be in addition to the above or below embodiments, the device may be controlled by computers, microprocessors, pressure valves, human operators or otherwise to provide and control a desired effect of the device. The control device, may be attached to sensors at any point within the input line, the device itself or the output line, as well as internally or externally and measure any and all aspects such as temperature, pressure, water content, unit weight of raw material, unit weight of agent or otherwise and may control varies aspects such as input pressure, output pressure, temperature, water content, raw or processing material input velocity or volume, unit weight of raw material, unit weight of agent and may be automatically or manually controlled.

In another embodiment which may be in addition to the above or below embodiments, the device may incorporate control surfaces, switches, solenoids and other devices that control various aspects such as input pressure, output pressure, temperature, water, processing, agent or raw material input velocity or volume, unit weight of raw material, unit weight of agent and may be automatically or manually controlled by the aforementioned computer, human operator, pressure valves or otherwise, and may do so automatically or manually.

In another embodiment which may be in addition to the above or below embodiments, the device inputs or outputs may use air pressure, water pressure or other devices such as conveyer belts, pipes, tubes or any process to move material into the present invention to be mixed or otherwise.

In another embodiment which may be in addition to the above or below embodiments, the device may use a compressor or other device either proximally or distally to provide a movement force for the materials to be processed.

In another embodiment which may be in addition to the above and below embodiments, the device may be made out of steel, aluminum, plastics or any material as desired and for use. The materials may differ throughout the invention, and may include different materials that may be harder or softer depending on the application such as the rotors or vanes may be made out of a harder alloy to resist wear, while the output pipe may be made out of plastic.

In another embodiment, which may be in addition to the above and below embodiments, the device may be adjustable and designed and made to any size to fit or be transported or allow for the use of any materials to be inputted.

In another embodiment, which may be in addition to the above and below embodiments, the device may adjust features such as the rotors, vanes, pressures, input angles, temperatures and other physical characteristics for a desired effect either automatically or manually and may include replacement of parts or adjustable parts or control surfaces.

In another embodiment, which may be in addition to the above and below embodiments, the device may be bypassed and allow raw or agent material to move further down line without processing.

In another embodiment, which may be in addition to the above and below embodiments, the device may "bypass" and allow some or all of the output to return back up stream of the device to be processed again or to relieve pressure along the line.

In another embodiment, which may be in addition to the above and below embodiments, the device may have an output that is used for remediation or other purposes immediately, such as an exit directly into a landfill, pit or various reclamation or construction purposes, or the device may output into a storage container, facility or device to be moved transported, or stored for later use or later transport.

In another embodiment, which may be in addition to the above and below embodiments, the device may be in any position relative to the ground, ocean or other location. The device may be in a vertical orientation, horizontal orientation or of any degree in reference to a plane.

In another embodiment, which may be in addition to the above and below embodiments, the device may accept any size, granularity, consistency, type or state of material that may have been dredged, scooped or otherwise and of which may be considered raw or un-raw. The input materials may also be a waste material from other processes or machinery, agents or any material for any purpose.

In another embodiment, which may be in addition to the above and below embodiments, the device may accept any size, granularity, consistency, type or state of agent for solidification, mixing, diluting or processing and may be of any material to be mixed.

In another embodiment, which may be in addition to the above and below embodiments, the device may be part of a larger device or system in which material is moved, for example a dredging operation moving material onto shore, and may be used in conjunction, at the benefit of, or providing the benefit for other machinery or devices.

In another embodiment, which may be in addition to the above and below embodiments, the device may be positioned at any point along a processing line, and may be placed at sea, on land, underwater, underground or otherwise for a desired effect.

In another embodiment, which may be in addition to the above and below embodiments, the device may be positioned at any point along a processing line, and may be placed at sea, on land, underwater, underground or otherwise for a desired effect and the device may be on a ship, barge or other floating means or may be on land in a vehicle, on the ground or positioned on another device, building or unit.

In one embodiment the present invention may, in addition to the above and below embodiments, provide for a material, which is homogenously mixed.

In one embodiment the present invention may, in addition to the above and below embodiments, provide for a material, which is heterogeneously mixed.

In one embodiment the present invention may, in addition to the above and below embodiments, provide for a material, which is mixed with at least a component being raw material and at least another component being an agent such as a hardening agent.

In one embodiment the present invention may, in addition to the above and below embodiments, provide for a material, which is mixed with at least a component being raw material and at least another component being an agent such as a hardening agent, such that the materials from a composite material.

In one embodiment the present invention may, in addition to the above and below embodiments, provide for a material, which is mixed with at least a component being raw material and at least another component being an agent such as a hardening agent, such that the materials from a composite material. In a preferred example the raw material is an aggregate material and the agent is a cement material.

In one embodiment the present invention may, in addition to the above and below embodiments, provide for a material, which is mixed with at least a component being raw material and at least another component being an agent such as a hardening agent, such that the materials from a composite material. In a preferred example the raw material is an aggregate material and the agent is a cement, forming concrete In one embodiment the present invention may, in addition to the above and below embodiments, provide for a material, which is mixed with at least a component being raw material and at least another component being an agent such as a hardening agent, such that the materials from a composite material. In a preferred example the agent is a cement such as cement or bitumen, but also may be any other hardening agent or hydraulic cement.

In one embodiment the present invention may, in addition to the above and below embodiments, provide for a material, which is mixed with at least a component being raw material and at least another component being an agent such as a hardening agent, such that the materials from a composite material. In addition to an agent, water may be introduced at a given point, whether through the raw material, wherein the water may be picked up while dredging as a byproduct, or may be added via a port along the input line, may be added to the agent input line, or may be added via a port at any point along the lines or mixing device structure. The water may react with the agent and material to form a hard matrix which binds together all the materials.

In one embodiment the present invention may, in addition to the above and below embodiments, provide for a material, which is mixed with at least a component being raw material and at least another component being an agent such as a hardening agent, such that the materials from a composite material and wherein, the contaminants, if present, may be suspended in the hardened matrix.

In one embodiment the present invention may, in addition to the above and below embodiments, provide for a material, which is mixed with at least a component being raw material and at least another component being an agent such as a hardening agent, such that the materials from a composite material and wherein, the contaminants, if present, may be suspended in the hardened matrix.

In one embodiment the present invention may, in addition to the above and below embodiments, provide for a material, which is mixed with at least a component being raw material and at least another component being an agent such as a hardening agent, such that the materials from a composite material and wherein, the contaminants, if present, may be suspended in the hardened matrix. This suspension may counteract the negative effects of the containments, preventing the contaminants from spreading into the ambient or environment, or may otherwise render the contaminants harmless.

In one embodiment the present invention may, in addition to the above and below embodiments, provide for a material, which is mixed with at least a component being raw material and at least another component being an agent such that at least one of the agents may react chemically or otherwise with the contaminants such that the contaminants may be made harmless, inert or less harmful to the ambient, environment or users.

In one embodiment the present invention may, in addition to the above and below embodiments, provide for a material, which is mixed with at least a component being raw material and at least another component being an agent such that at least one of the agents may react with the contaminants such that the contaminants may be made harmless or less harmful to the ambient, environment or users and another agent may be a hardening agent or similar material, wherein the containments or byproduct of the reaction may be suspended or otherwise rendered inert or unable to effect the ambient, environment or users within the mixed product.

Figure 1:
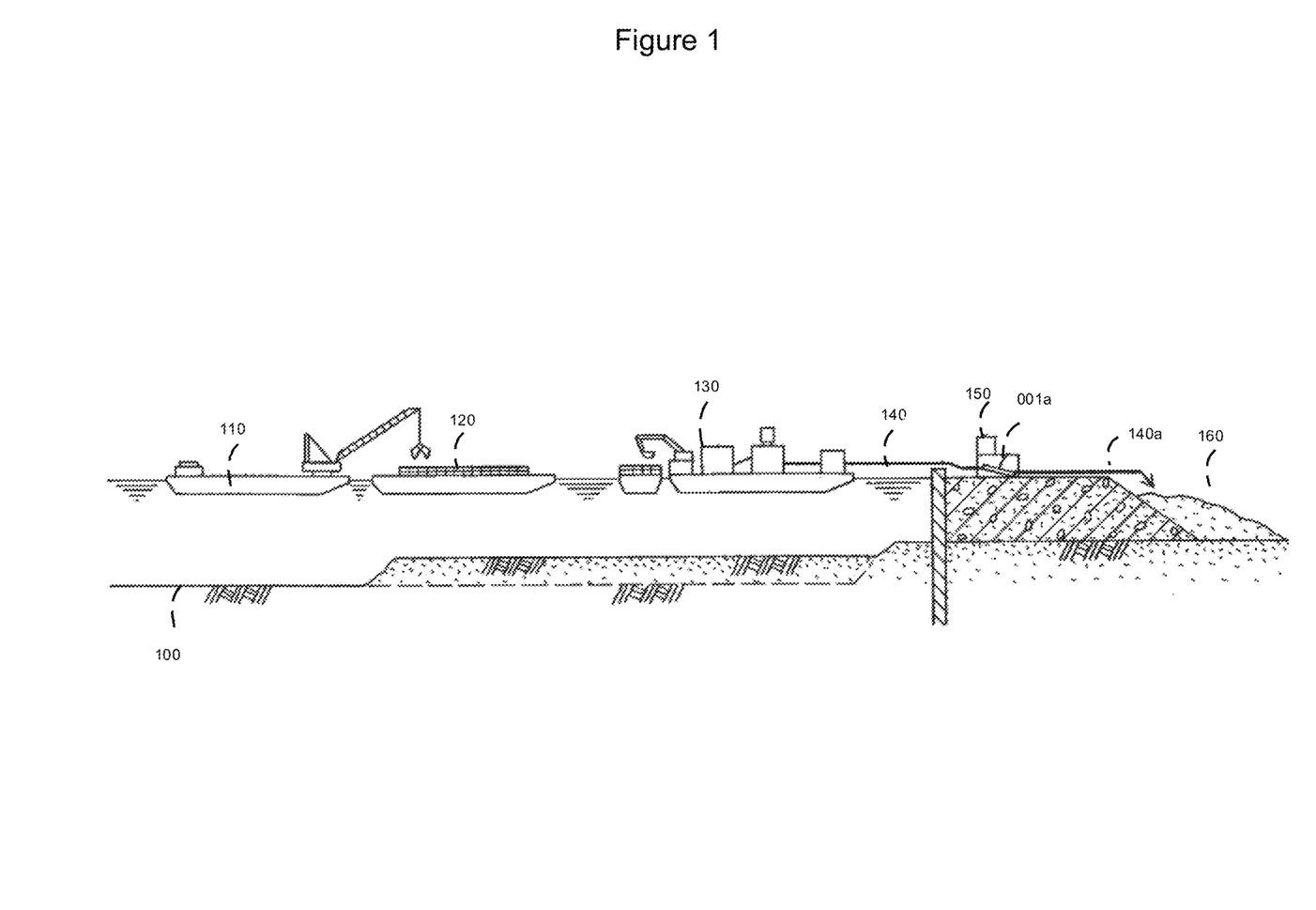
FIG. 1 is a diagram showing a systematic outline of moving raw material onto an onshore destination for processing using the present invention and associated machinery and needs.

FIG. 1 is a diagram depicting a systematic outline of moving raw material onto an onshore destination, which may be a land fill or land reclamation or other use of the finished product including construction and recycled uses. The intermediate steps may include at least one dredger or other process or machinery to remove and uptake the raw material from a waterway floor 100, harbor, lake, etc. to at least one barge, ship, platform, or container 120 which may be floating or grounded as a material carrier or holding device. At least one barge, ship platform, or container 130, of which may be floating or grounded and may provide air pressure or another device or process to pump or move the raw material to shore or another floating or grounded vessel or container 130. Pipe or line 140 may be a pipe or other device which the raw, processed or partially processed or material is moved to shore, barge, container or platform where further processing may continue. Structure 150 may be a processing building, ship or platform that provides an agent which may be hardening material, cement, cement slurry or other similar material. Structure and device 001a may be the present invention of a tubular in-line mixing device which homogenously or heterogeneously mixes the agent and the raw material forming a mixed material which may be used either for remedial or other uses. Pipe or line 140a may be a pipe, line or other transportation device which may move the processed homogenously or heterogeneously mixed material to another location. Area 160 may be a landfill or other location of use for the now mixed material, of which may be landfill or land reclamation as pictured in this embodiment, but may be any use of which is not pictured, such as use as a construction material or other building structure.

Figure 2:
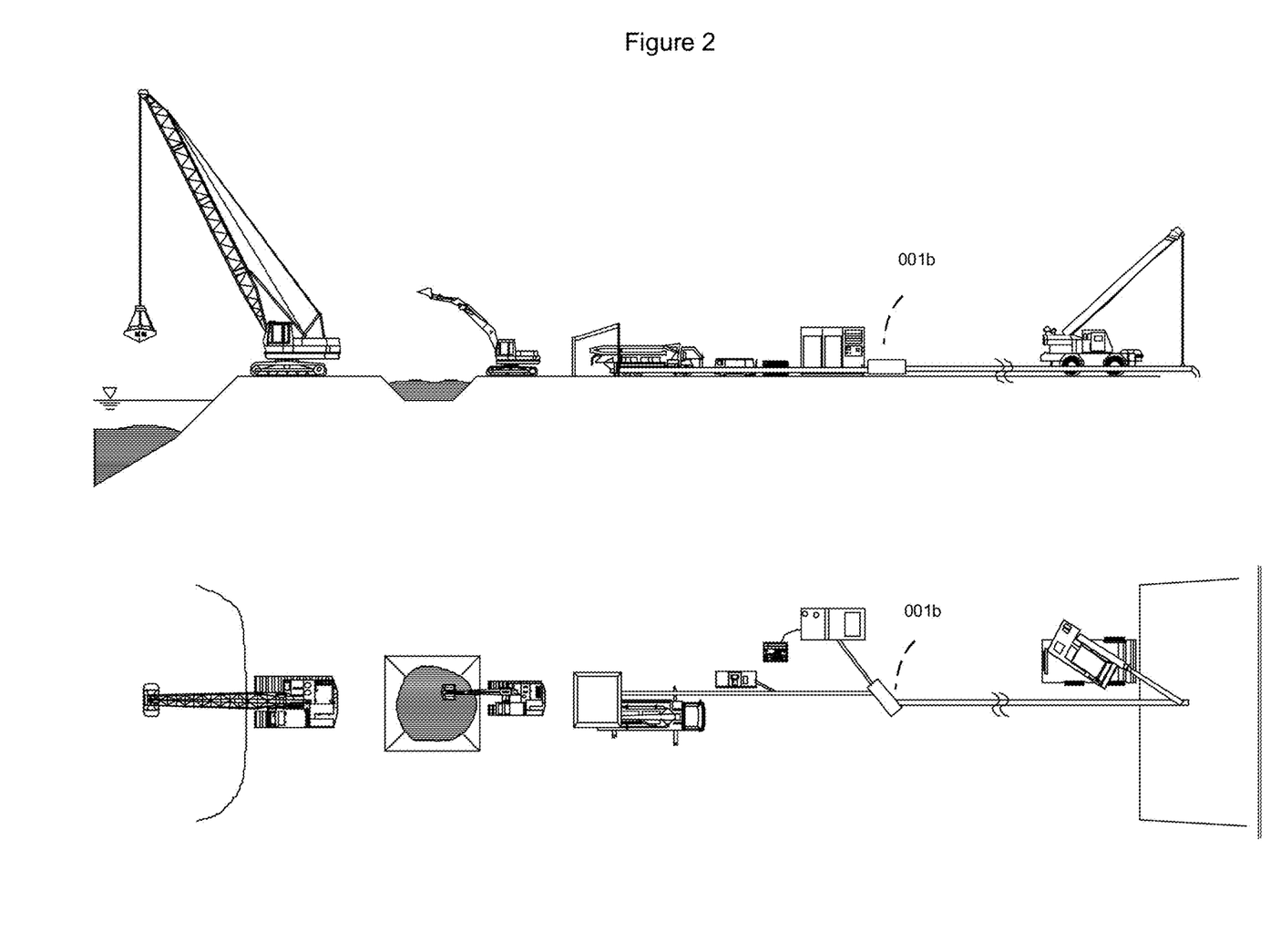
FIG. 2 is an alternate embodiment of FIG. 1 showing a systematic outline of moving raw material of which may be dredged onto an onshore destination for processing using the present invention onshore and where some associated machinery and needs are off-shore.

FIG. 2 is an alternate embodiment of FIG. 1 with an alternate location of the various processes, machinery and material locations as their locations are not limited to respective locations in any of the embodiments and may be in combination of on-shore, off-shore or otherwise. This embodiment represents the ability for the machinery and present invention 001b to be on shore. Area or material source 100, of which may be underwater, as pictured, but also may be on ground, may provide the present invention with a material, such as a contaminated material to the present invention, such that a crane or other water based or ground based machinery may move the material to a holding area, such as a storage pit 120. From the storage pit 120, the material may be moved to a pumping device, such as a mobile pumping truck 130, of which may pressurize, using air pressure or any other method to pressurize or otherwise move the material through the lines or conveyors of any length, such that the material reaches the mixing device 001b, of which may be in line with the pipes in which the material is being moved within. Connected to the device may be a structure or device which presents an agent, such as a hardening agent to the device, and of which then the mixing device 001b mixes the agent with the material. The material, now mixed with the agent, may travel via pipe 140a or any method of any length to a location and processes 160, of which uses the mixed material for a benefit, such as using the mixed material, with agent which is now mixed concrete for construction use.

Figure 3:
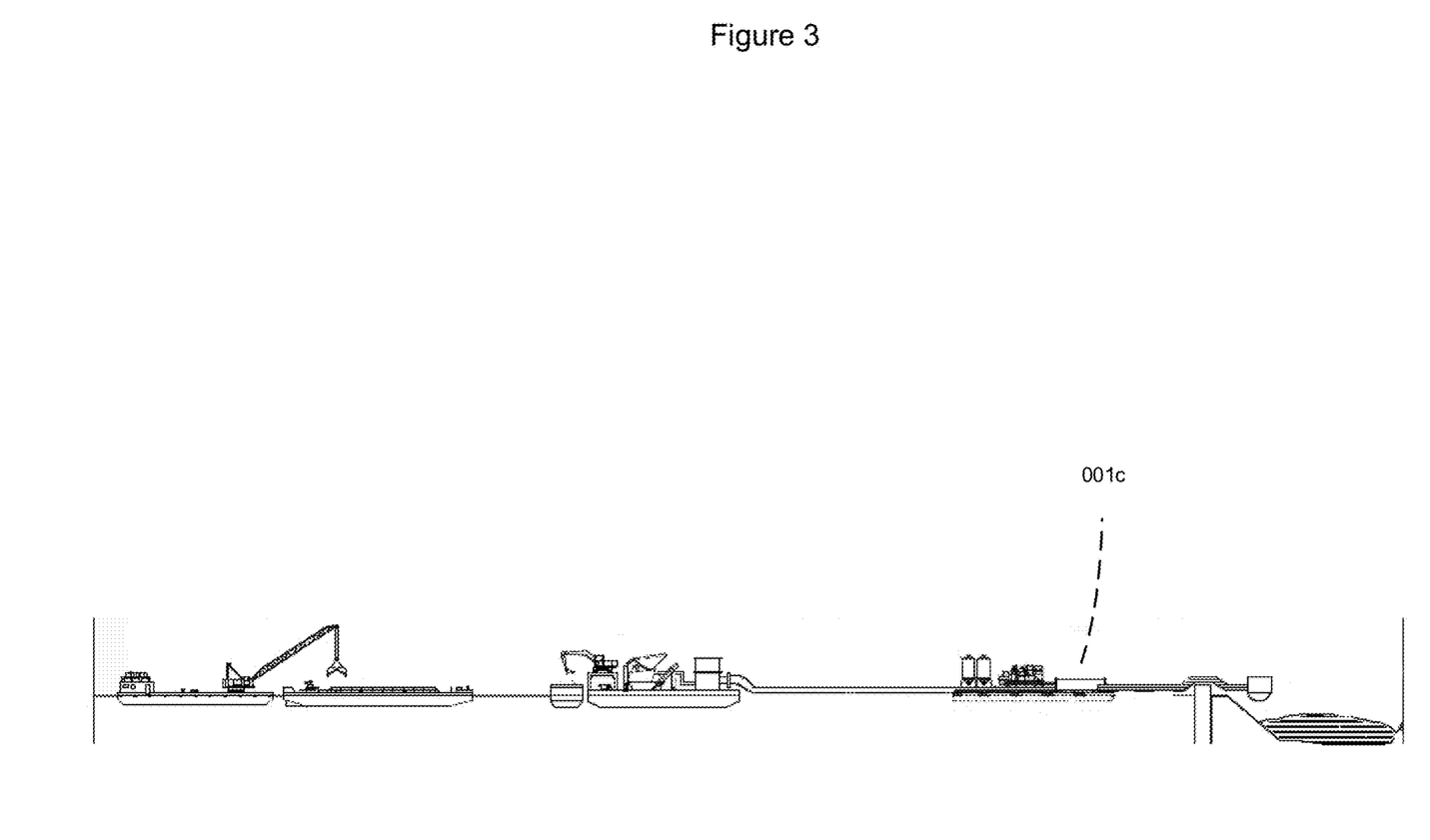
FIG. 3 is an alternate embodiment of FIG. 1 showing a systematic outline of moving raw material of which may be dredged onto an onshore destination for processing using the present invention and where the present invention and associated machinery and needs are off-shore.

FIG. 3 is an alternate embodiment of FIG. 1 with an alternate location of the processes, machinery and materials locations as their locations are not limited to respective locations and may be in combination of on-shore, off-shore or otherwise. This embodiment represents the ability for all, or at least some of the machinery and present invention 001c to be off shore such as dredging barge 110, storage and transporting barge 120, pumping barge 130, pumping lines 140, processing barge with agent providing device 150 and mixing device 001c. Pipes 140a then may bring the material onshore as pictured at location 160, but also the material may be placed underwater for any use.

Figure 4:
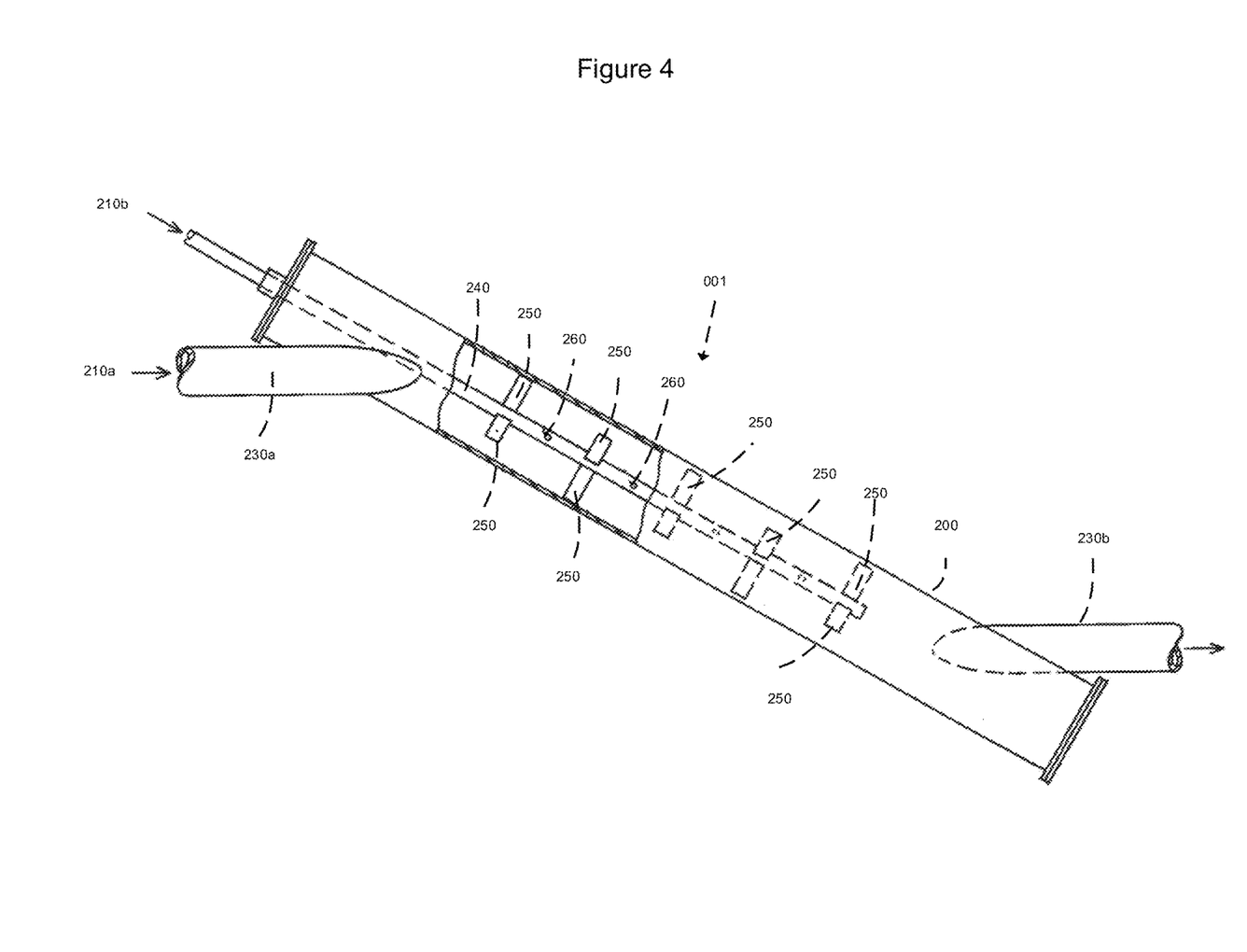
FIG. 4 is a partial cross-sectional side view of the tubular in-line mixing device as described above according to the present invention.

FIG. 4 is a partial cross-sectional side view of the tubular in-line mixing device as described above according to the present invention. Device 001 may be the diagonally opposed tubular in-line mixing device of the present invention. Cylinder structure 200 may be the main mixing structure tube diagonally opposed with inlet 230a which may be an input tube or pipe for the raw material and outlet 230b which may be the output for the mixed material product. Inlet 230a and outlet 230b may be of smaller diameter than the tubular mixing tube 200 which may increase turbulence, agitation and mixing of the raw material with the agent or processing material. Also, in an embodiment, inlet 230a may be a larger diameter than outlet 230b, causing the mixing device to act as a bottleneck, creating further agitation and mixing. Also, in an embodiment, inlet 230a may be a smaller diameter than the mixing device diameter cylinder structure 200 and outlet 230b, wherein the increasing area available for the material causes further agitation, turbulence and mixing. Inlet 230a may be connected to an air or otherwise pressurized pipe connecting to a source of the raw material and may have a flow of material leading into the tubular in-line mixing device. Outlet 230b may be connected to a pipe or other transportation device which may be under pressure of which the mixed material flows out of the tubular in-line mixing device and towards a destination or location for use through further piping or other devices. Inlet 210b may be an agent such as a hardening agent of which may be under pressure. Inlet 230a may be an input tube or pipe for the raw material and outlet 230b may be the output for the mixed material product. Tube or shaft 240 may be the inner shaft that may carry an agent or processing material at any pressure through the center of the in-line tubular mixing device. Fins 250 may be fins, vanes or blades and may cause turbulence, agitation and mixing as the raw material and the agent or processing material travel down the tubular in-line mixing tube section 200. Ports 260 may be the ejection ports of which the agent may exit the inner shaft and mix with the raw material. Ports 260 may be situated at irregular or regular intervals and may be any shape or size facilitated by need and material. Ports 260 may facilitate in agitation, turbulence and mixing of the raw material and agent or processing material by the use of a high pressure differential between the raw material and agent as the agent exits the ejection ports.

Figure 5:
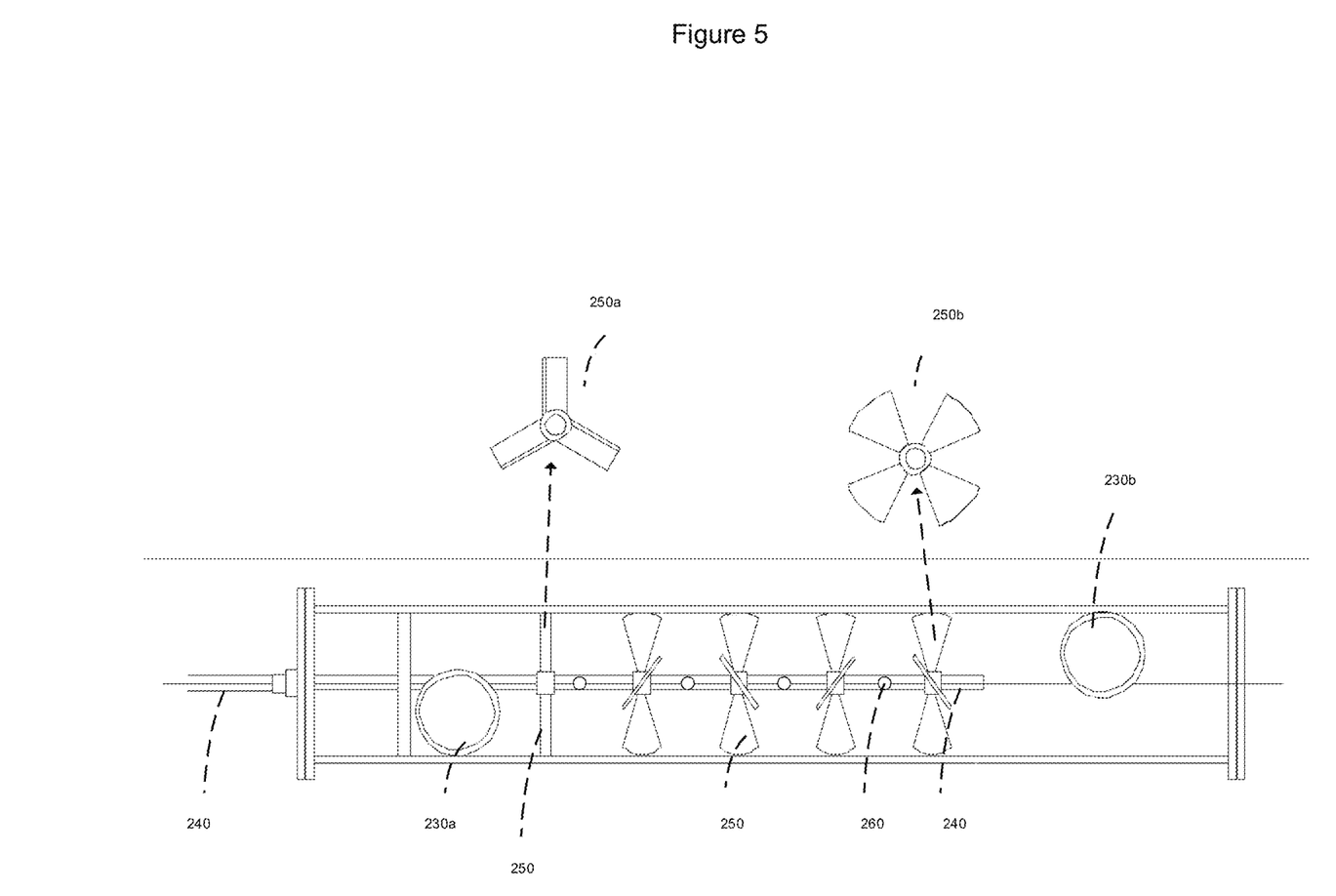
FIG. 5 is a cross-sectional side view of the tubular in-line mixing device as described above according to the present invention.

FIG. 5 is an alternate cross sectional view of the present invention with alternate embodiments of the rotors or vanes as 250a and 250b. The vanes and rotors in this embodiment represent that the rotors or vanes may be of different size, shape and design and may be spaced or oriented in any fashion or position given the specified need for agitation. In addition ports 260 may be spaced at any interval along the inner shaft 240 and outlet 230b is shown to be in alignment with inlet 230a. In some embodiments inlet 230a and 230b may be diagonally opposed, horizontally opposed or at any angle or relation to each other.

Figure 6:
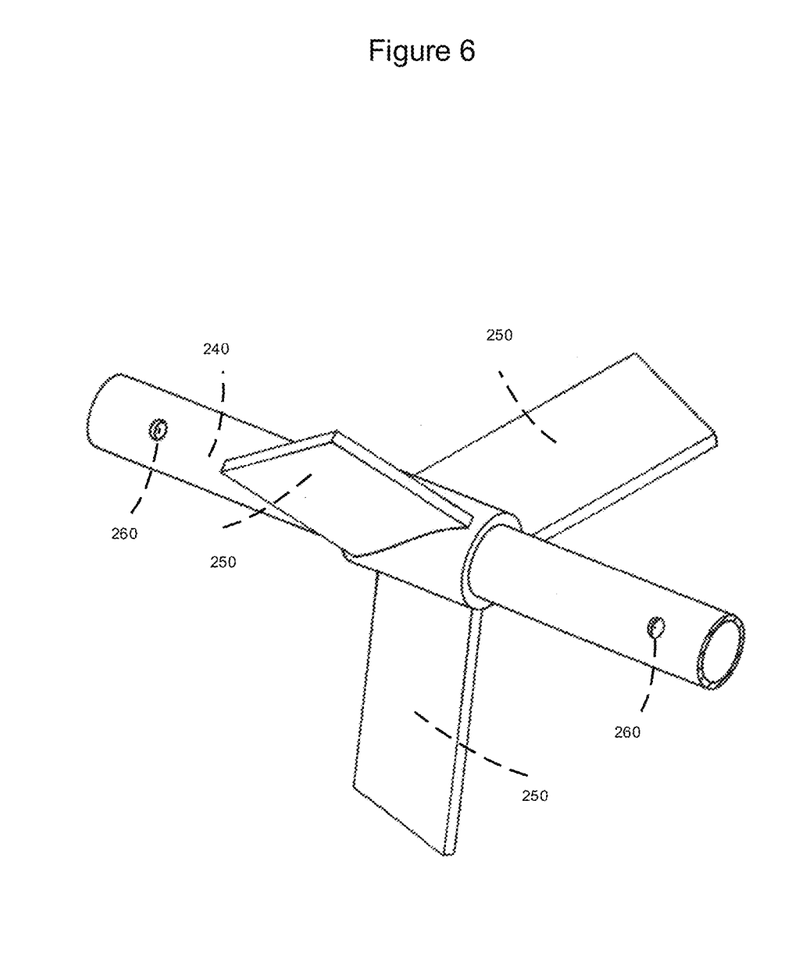
FIG. 6 is an exploded enlarged view of the inner shaft with agitation and mixing devices and ejection ports.

FIG. 6 is an exploded enlarged view of the inner shaft with agitation and mixing devices and ejection ports. Blades, vanes or fins 250 may be radial fins, vanes or blades that may be connected to the inner shaft and interior of the mixing tube 240. Blades, vanes or fins 250 may be of any shape, design, structure or plurality and may be position at any angle to the flow of material. Fins, vanes or blades 250 may cause turbulence, agitation and mixing as the raw material and the agent or processing material travel down the tubular in-line mixing tube section. Shaft 240 may be the inner shaft that may carry an agent at any pressure through the center of the in-line tubular mixing device. 260 may be the ejection ports of which the agent or processing material may exit the inner shaft and mix with the raw material. Ports 260, of which may be ejection ports, may be situated at irregular or regular intervals and may be any shape or size facilitated by need and material. Ports 260 may facilitate in agitation, turbulence and mixing of the raw material and agent by the use of a high pressure difference between the raw material and agent or processing material as the agent or processing material exits the ejection ports.

Figure 7:
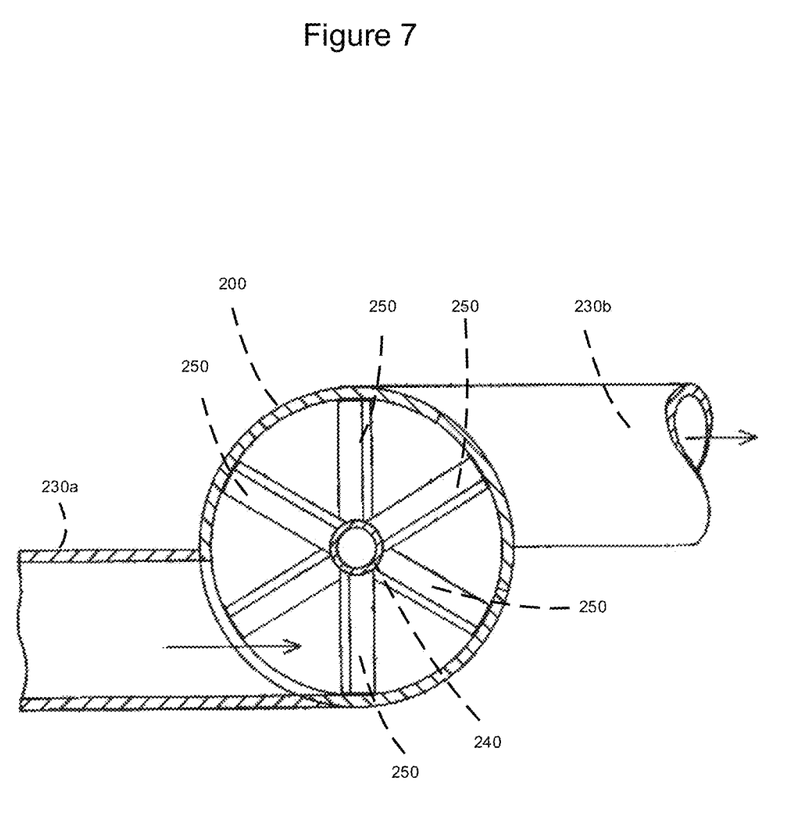
FIG. 7 is a vertical interior sectional view of the tubular inline mixing device with inner shaft and agitation and mixing devices.

FIG. 7 is a vertical sectional view of the tubular inline mixing device. Structure 200 is the tubular mixing tube diagonally opposed with inlet 230*a* which may be an input tube or pipe for the raw material and outlet 230*b* which may be the output for the mixed material product. Inlet 230*a* and outlet 230*b* may be of smaller diameter than the tubular structure 200 of the tubular inline mixing device which may increase turbulence, agitation and mixing of the raw material with the agent or processing material. Inlet 230*a* may be connected to an air or otherwise pressurized pipe connecting to a source of the raw material and may have a flow of material leading into the tubular in-line mixing device. Outlet 230*b* may be connected to a pipe or other transportation device which may be under pressure of which the mixed material flows out of the tubular in-line mixing device and towards a destination or location for use through further piping or other devices. Shaft 240 may be a fixed shaft within and running the length of the tubular in line mixing device and connected to a pressurized or unpressurized source of agent which may have a flow of material into the present invention. The shaft 240 may be secured obliquely to the inner walls of the present invention and radially with the fins, vanes or blades 250. The shaft 240 may have multiple agent material ejection ports at equal or unequal intervals in the shaft. The ejection ports may allow the agent or slurry of agent to mix through high-pressure injection. 250 may be the radial fins, vanes or blades that may be connected to the inner shaft and interior of the mixing tube 200. Blades, vanes or fins 250 may be of any shape, design, structure or plurality and may be position at any angle to the flow of material.

Figure 8:
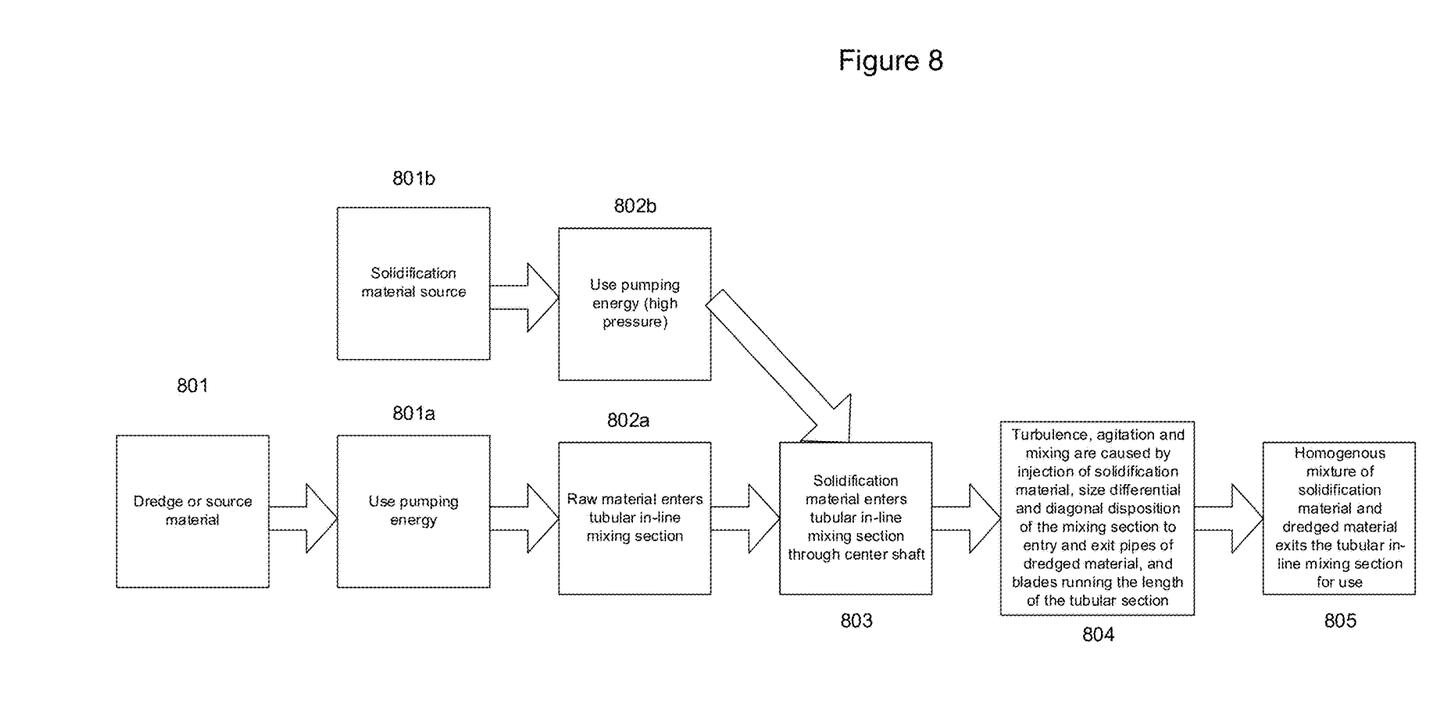
FIG. 8 is an embodiment of a flowchart illustrating the process of homogenously mixing raw material and an agent material using the present invention.

FIG. 8 is an embodiment of a flowchart illustrating the process of homogenously mixing raw material and agent using the present invention. The steps may include but are not limited to the order or those mentioned in the embodiment. There may also be steps that follow the application or need but are not mentioned in the embodiment. Step 801 may be the process or action of receiving, mining, dredging or otherwise sourcing the raw material. Step 801*a* may be the use of a machine or other action or process to pump or otherwise move the raw material to a further location for processing including, a barge, ship, container or location on or off shore, wherein the pressure or pumping may allow the material to move throughout the process and steps. Step 801*b* may be the process or action of receiving, mining, manufacturing or otherwise sourcing the agent. Step 802*b* may be the use of a machine or other action or process to pump or otherwise move and pressurize the agent to be inputted into the mixing section. Step 802 may be the step wherein the raw material enters the tubular in-line mixing section through the raw material inlet. Step 803 may be the process and action of the agent entering the tubular in-line mixing section through the center shaft. Step 804 may be the process and action of turbulence agitation and mixing caused by the injection of the agent under possible high-pressure through the entry nozzles, the size differential and accompanying pressure difference and associated properties including but not limited to the diagonal disposition of the mixing section in respect to the entry and exit tubes, and the vanes and rotors within the mixing section with various sizes and designs depending on application. Step 805 may represent the homogenous mixture of the agent and raw material exiting the mixing section and ready for the intended use.

Figure 9:
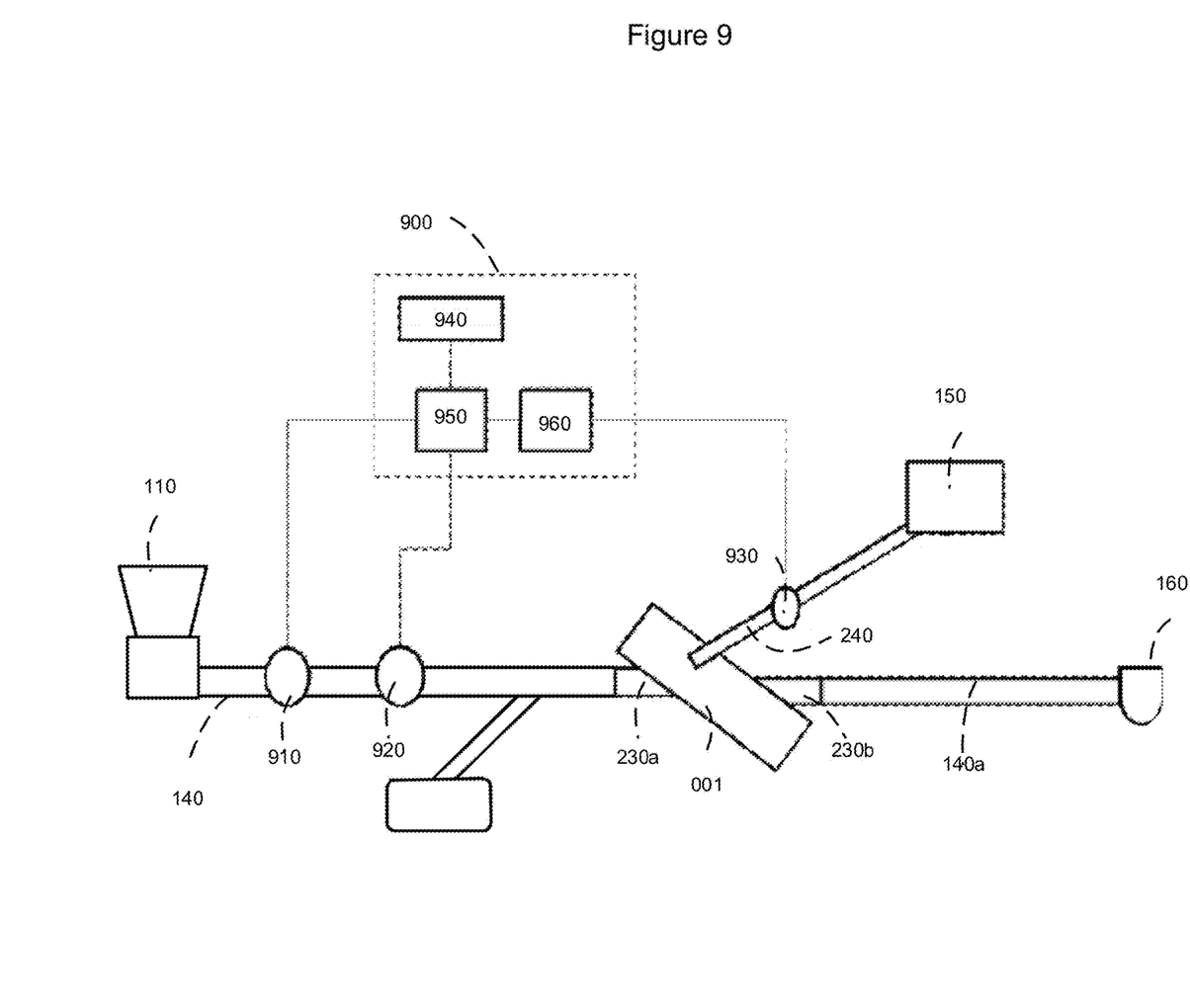
FIG. 9 is an embodiment of a component diagram illustrating the process of homogenously mixing raw material and agent using the present invention including control computing sensors and control points.

FIG. 9 is an embodiment of a flowchart illustrating the process of homogenously mixing raw material and agent using the present invention including UI and control computing and sensors. The FIG. 9 embodiment examples the aforementioned device, method and apparatus, with for example, a raw material source 110, a pipe moving the raw material from the source 110 to the inlet 230*a* of the mixing device 001, mixing with an agent material from a source 150 which inputs into the mixing device through pipe and shaft 240, wherein the raw material and agent material mix in the device 001 and are outputted through outlet 230*b* to travel through a pipe 140*a* to a destination for storage, transportation or use 160. The embodiment examples the use of sensors 910, 920 and 930 which may represent density meters, flow meters, electro-magnetic sensors, viscosity sensors, temperature sensors, water content sensors including gamma-ray densitometers, UV sensors and any and all sensors one familiar in the art would reasonably intend. The embodiment enlists sensors 910, 920 and 930 and an additional embodiment may enlist sensors located at additional or alternate points within the system, pipe and process in any plurality, method or attachment, such as a sensor in the outlet 230*b*, measuring material output from the device 001. This embodiment displays sensors 910, 920 and 930 connecting by any digital, analog, physical or wireless method to a control module 900 which may represent a computer or other control module, computer, display, surface or reactive variable and may include 940, 950 and 960 which may represent computers, data conversion, flow control process, pressure valves and any control products one familiar in the art may find useful or necessary. Control module 900 may be connected back to the system and control pressure, valves, temperature, flow direction, content, and any other variable both measured and not measured to adjust to need and may be interchanged or in addition to sensor 910, 920, 930 locations. In an embodiment, this system can control the raw material input amount and pressure, the agent or processing material input and pressure and the water content to allow the present invention to homogenously mix the raw material and agent to a desired characteristic.

Figure 10:
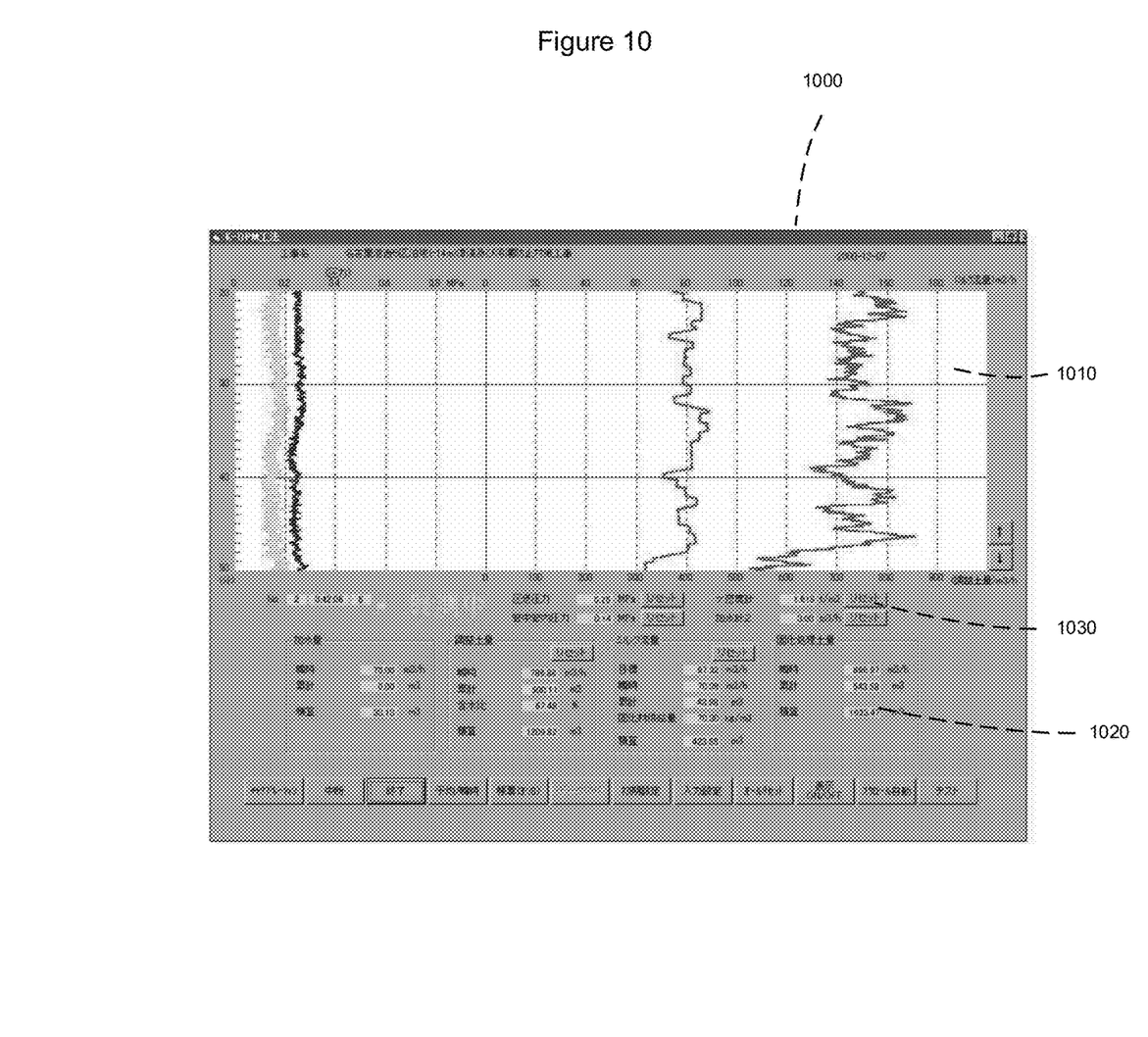
FIG. 10 is an embodiment of the UI control display for the present invention including control, UI and associated data Other features of the present embodiments will be apparent from the accompanying drawings and from the detailed description that follows.

FIG. 10 is an embodiment of the UI for the control of the process and method through the use of the control module 900 and sensors and control surfaces in FIG. 9 and the associated process variables. An embodiment may include a user interface (UI) 1000. This UI may include and display data and measurement values and variables graphically 1010, in a displayed format 1030 or in additional alternate views as dictated by need and one familiar in the art would find useful. The data may vary and can include any and all measurements from the sensors or otherwise. The UI may include manual and automatic control buttons 1030 and other user interface devices for various measured and unmeasured variables and manual data viewing.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied, and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. An in-line mixing device comprising a main structure forming a hollow internal recess along the internal length of the structure and further comprising multiple elements, wherein the elements are at least:
   a first element is at least one main inlet, wherein:
      the first element inputs raw material into the hollow internal recess;
   a second element is at least one main outlet, wherein:
      the second element outputs a mixed material from the hollow internal recess;
   a third element is at least one auxiliary input, wherein:
      the third element inputs an agent material into the hollow internal recess;
   a fourth element is at least one turbulence creating device, wherein:
      the fourth element creates turbulence and agitation, mixing the raw material and agent material.

2. A mixing device as in claim 1, wherein:
   the main structure is a cylindrical tube.

3. A mixing device as in claim 1, wherein:
   the first element inlet and the second element outlet are diametrically opposed and are positioned at opposite lengths of the structure, such that the raw material flows from the first element inlet, through the length of the internal hollow recess, and into the second element outlet, and additionally the agent material flows from the third element inlet, through the internal hollow recess and into the second element outlet.

4. A mixing device as in claim 1, wherein:
   the first element inlet and second element outlet are positioned at an angle in respect to the axis of the length of the internal hollow recess, wherein the angle of the inlet and angle of the outlet cause turbulence, agitation and mixing of the raw material and agent material.

5. A mixing device as in claim 1, wherein:
   the main structure internal hollow recess, first element inlet and second element outlet are different widths aiding in the turbulence, agitation and mixing of the raw materials and agent materials.

6. A mixing device as in claim 1, wherein:
   the raw material is dredged soil.

7. A mixing device as in claim 1, wherein:
   the mixed material is a homogenously mixed material of the raw material and the agent material.

8. A mixing device as in claim 1, wherein:
   the agent material is a hardening agent.

9. A mixing device as in claim 1, wherein:
   the mixed material outputted is a form of concrete, wherein the raw material is used as an aggregate material and the agent material is a concrete hardening material.

10. A mixing device as in claim 1, wherein:
    the third element penetrates the main structure at one short end of the structure and inputs the agent material.

11. A mixing device as in claim 10, wherein:
    the third element additionally comprises a hollow shaft that protrudes the hollow internal recess for a distance, wherein the shaft has multiple ports at varying distances and positions, and wherein the ports input the agent material from the hollow shaft into the hollow recess such that the agent material is mixed with the raw material.

12. A mixing device as in claim 10, wherein:
    the agent material is inputted under pressure, of which upon entering the internal hollow recess, creates agitation and turbulence, mixing the agent material with the raw material.

13. A mixing device as in claim 1, wherein:
    the fourth element is at least one vane or rotor at varying intervals along the length of the internal hollow recess.

14. A mixing device as in claim 13, wherein:
    the vanes or rotors span across the internal hollow recess.

15. A mixing device as in claim 13, wherein:
    the vanes or rotors are able to interact with the raw material and agent material as the raw material flows from the first element to the second element and as the agent material flows from the third element to the second element, creating turbulence and agitation, aiding in the mixing of the raw material and agent material.

16. A mixing device as in claim 1, wherein:
    a fifth element is at least one sensor wherein the sensor aids in determining the agent material and the raw material flow rate and pressure.

17. An in-line mixing device comprising a cylindrical main structure forming a hollow internal recess along the internal length of the structure and further comprising multiple elements, wherein the elements are at least:
    a first element is at least one main inlet, wherein:
       the first element inputs raw material into the hollow internal recess, and
       the first element is positioned at an angle in respect to the axis of the length of the internal hollow recess, and wherein the angle of the inlet causes turbulence, agitation and mixing of the raw material and agent material;
    a second element is at least one main outlet with a different circumference than the first element inlet, wherein:
       the second element outputs a mixed material from the hollow internal recess,
       the second element outlet is diametrically opposed in respect to the first element and positioned at opposite lengths of the cylindrical structure, such that the raw material flows from the first element inlet, through the length of the internal hollow recess, and into the second element outlet, and
       the second element is positioned at an angle in respect to the axis of the length of the internal hollow recess, wherein the angle of the outlet causes turbulence, agitation and mixing of the raw material and agent material;

a third element is at least one auxiliary input, wherein:
  the third element comprises a hollow shaft that extends into the hollow internal recess for a distance, and wherein the shaft has multiple ports at varying distances and positions, and the ports input the agent material at pressure from the hollow shaft into the hollow recess such that the agent material is mixed with the raw material;
a fourth element is at least one turbulence creating device, wherein:
  the fourth element is at least on vane or rotor spanning across the internal hollow recess of which creates turbulence and agitation, mixing the raw material and agent material as the raw material flows from the first element to the second element and the agent material flows from the third element to the second element.

18. A mixing device as in claim 17, wherein:
the raw material is a dredged material.

19. A mixing device as in claim 17, wherein:
the mixed material is a homogenously mixed material of the raw material and agent material.

20. A mixing device as in claim 17, wherein:
a fifth element is at least one sensor wherein the sensor aids in determining the agent material and the raw material flow rate and pressure.

* * * * *